United States Patent
Fling et al.

(10) Patent No.: US 7,053,789 B2
(45) Date of Patent: May 30, 2006

(54) UNDERGROUND OBJECT LOCATOR

(75) Inventors: Ricard W. Fling, Saltford Bristol (GB);
Alberto Iaccarino, Cheltenham (GB)

(73) Assignee: Radiodetection Limited, Bristol (GB)

(*) Notice: Subject to any disclaimer, the term of this patent is extended or adjusted under 35 U.S.C. 154(b) by 460 days.

(21) Appl. No.: 10/631,008

(22) Filed: Jul. 31, 2003

(65) Prior Publication Data
US 2005/0024989 A1  Feb. 3, 2005

(51) Int. Cl.
*G01V 3/00* (2006.01)

(52) U.S. Cl. ............... 340/855.8; 166/254.2; 702/6

(58) Field of Classification Search ............ 166/254.2, 166/254.1; 702/6; 340/855.8
See application file for complete search history.

(56) References Cited

U.S. PATENT DOCUMENTS

| | | | | |
|---|---|---|---|---|
| 4,490,609 A | * | 12/1984 | Chevalier | 250/269.1 |
| 4,511,843 A | * | 4/1985 | Thoraval | 324/338 |
| 5,515,039 A | | 5/1996 | Delattore | 340/854.9 |
| 6,179,055 B1 | * | 1/2001 | Sallwasser et al. | 166/254.2 |
| 6,691,779 B1 | * | 2/2004 | Sezginer et al. | 166/250.01 |

FOREIGN PATENT DOCUMENTS

| | | |
|---|---|---|
| GB | 2009930 | 11/1978 |
| GB | 2404394 A * | 2/2005 |

OTHER PUBLICATIONS

Great Britain Search Report dated Nov. 13, 2003.

* cited by examiner

*Primary Examiner*—Timothy Edwards, Jr.
(74) *Attorney, Agent, or Firm*—Baker & Hostetler LLP

(57) ABSTRACT

A data sonde for use in horizontal directional drilling comprising a battery housing to receive a power supply from an internal battery, a connector to receive a power supply from an external power supply cable, and an antenna to emit radiation, is provided, wherein the antenna is arranged to receive operative power from an external power supply when one is connected to the connector, and from a battery housed in the battery housing if no external power supply is connected to the connector. A method of operation of the same is also provided. Additionally, a system for communicating between a data sonde and a remote apparatus connected by cable power supply is provided, the system comprising circuitry to control the energisation of an antenna in the data sonde with a modulation representing data to be transmitted to the remote receiving apparatus, and a detector at the remote apparatus to detect the data for output at the remote apparatus from the DC modulation in base band power consumption of the data sonde corresponding to the DC modulated energising of the data sonde antenna.

37 Claims, 12 Drawing Sheets

UNDERGROUND OBJECT LOCATOR

FIELD OF THE INVENTION

The present invention relates to downhole locators, commonly known as sondes. In particular, the present invention relates to sondes for use in horizontal applications, such as pipe laying and utility cable installation etc.

BACKGROUND OF THE INVENTION

Sondes are widely used in horizontal drilling applications such as pipe laying, and utility cable installation applications. In such situations, sondes are used to provide information on the location of the head of the drill. This is generally achieved by emission of an electromagnetic signal from the sonde and detection of the signal on the surface. Additionally, the sonde may provide other information to the surface, such as the azimuthal angle, yaw and pitch etc.

Sondes are generally powered using a wireline from a power supply on the surface to the sonde. Such sondes are generally also controlled from the surface by using a dedicated line within the wireline from the surface, along the pipe, to the sonde. The dedicated line may then also be used for the sonde to communicate back to the surface with details of azimuthal angle etc. Such wireline sondes have a disadvantage that the range is limited by the length of the wireline from the surface to the sonde, and operational time is increased, along with inconvenience and cost, by the need to insert sections of communication and power cable within the rods used to push the drill head and sonde underground during drilling.

Battery powered sondes may be used in order to overcome this range problem. However, removal of the wireline also removes the dedicated control and communication channel meaning that the surface control can no longer directly communicate with the sonde, and the sonde can no longer directly communicate with the surface. In order to overcome this, U.S. patent application Ser. No. 09/504,833, the contents of which are incorporated herein by reference, allows control of the sonde by a series of coded rotations of the head containing the sonde, which the sonde detects and decodes into instructions. The communication from the sonde to the surface can be achieved by applying a modulation to the EM location signal emitted by the sonde. However, such battery powered sondes have disadvantages in that the power of the sonde signal is weakened, resulting in shallower depths of operation than a wireline sonde, both for location of the sonde, and for receiving the further EM modulation of the emissions from the sonde communicating to the surface. Other ambient EM radiation also interferes with the signal reducing the effective range of the sonde.

As discussed above, both wireline and battery powered have advantages and disadvantages. However, a user of sondes is required to buy both a battery powered sonde and a wireline sonde for the different requirements. This is because, generally, it is not possible to combine a battery powered sonde with a wireline sonde in a single apparatus because the circuitry for each is mutually exclusive and a different communication method is used for each, resulting in a size requirement too large to be placed in an industry standard sonde casing.

Therefore, there is a need to provide a single industry standard dimensional sonde that can combine the one or more of the advantages of each type of sonde described above, and/or mitigate or ameliorate at least one of the disadvantages of the prior art.

SUMMARY OF THE INVENTION

According to a first aspect of the invention, there is provided a data sonde that may be battery powered or wireline powered. In an embodiment of the invention, the data sonde operates in the same manner whether powered by one or more batteries, or wireline powered. In an embodiment the same communication circuitry is used whether the sonde is battery or wireline powered. In an embodiment of the invention, the data sonde is house in an industry standard housing such as Radiodetection Ltd model RD385, having industry standard dimensions, so that it can be used in place of existing data sondes in existing drilling heads. In an embodiment of the invention, the data sonde may be changed between wireline and battery operation without a change of method of operation and function of the sonde. In an embodiment of the invention, the data sonde may be changed between a wireline and battery operated data sonde by insertion of either a wireline connector or one or more batteries into a power supply receiving unit. In an embodiment of the invention, the data sonde senses whether it is operating in wireline or battery mode in order to change the output power of the EM emission from the antenna.

In an embodiment of the invention, the sonde operates by communicating by modulation of the EM emission. Because of the small volume in the sonde it is advantageous for the sonde to function in the same manner whether the sonde is operating in wireline or battery mode, in order to minimise component requirements, which would otherwise be required to make use of one communication method when in wireline operation and a second method of communication when in battery operation. In another embodiment, the sonde has a battery fitted in it at all times.

In an embodiment, the communication between sonde and surface when in wireline and battery mode is by modulation of the energisation of the antenna, by providing a secondary signal, in addition to the signal emitted by the antenna when at constant energisation.

As stated above, because of the requirement for small size of sondes, separate communication methods between ground and surface, depending upon whether the sonde is wireline or battery operated, are not desirable. Therefore, the same method of operation should be used in both cases. The medium of communication between sonde and surface is different for wireline and battery operation. When in wireline operation, the communication should be along the wireline, in order to benefit from the advantages given above. However, when in battery operation, the communication should be via EM emission detected at the surface, in order to benefit from the advantages of battery sondes given above.

Standard sonde radiative emission modulation is at a frequency of many KHz. While such a frequency is suitable when the sonde is battery operated, at such frequencies, a battery cannot be included in the wireline circuit when the sonde is operating as a wireline sonde. This is because, at such frequencies, the battery acts as a capacitor in paralel with the wireline to the surface and the antenna. The battery therefore smooths and absorbs any AC modulation signal from the antenna passing through it by presenting a low impedence path across the circuit, and the modulation energy is wasted in heating the battery, so reducing the effectiveness of the sonde communication channel.

Therefore, in an embodiment of the invention, the modulation applied to the EM emission circuit is a binary on-off modulation to the antenna output as a whole, rather than, or as well as AC modulation. In an embodiment, the binary modulation is applied to the power control of the antenna via control circuitry acting as a switch for the antenna and, in a further embodiment, acting as an AC isolator. The DC modulation is coded for the communication channel from the sonde to the surface. The control circuitry turns the antenna high frequency output on and off at a low frequency to produce a secondary signal in addition to any signal carried in the high frequency output. When the sonde operates in wireline mode, this change in power drawn by the sonde can be decoded from the DC modulation at the power supply at the surface control unit, into the secondary signal. When in battery operation, the same binary signal can be detected using locator equipment adapted to detect the binary modulation in EM emission from the sonde.

In an embodiment, the high frequency output is used in the location of the sonde underground. Any AC modulation from the antenna circuit that is not isolated will be removed from the wireline communication by the battery as discussed above. However, the DC voltage modulation (turning the antenna circuit on and off) is not removed by the battery as it is at a low frequency and simply corresponds to whether a current is being drawn by the sonde antenna circuit or not. This low frequency DC modulation is therefore not absorbed by the battery, in embodiments where a battery is always present in the sonde.

The secondary signal is received at the surface by analysis at the surface of the power supplied to the data sonde by the power supply circuit. The power supply circuit will show the power drawn by the antenna, which is generally much larger than that used by the control circuitry, and the modulation applied to the EM emission can be detected in this way. By this method, the modulation can be detected when in wireline mode even when the sonde is too deep below ground for the radiated EM signal to be detected or processed from above ground.

In an embodiment of the invention, the battery is replaced by an additional inductive winding when the sonde is in the battery mode. The additional winding has the EM modulation emitted by the antenna induced on it, which then travels up the wireline to be detected at the surface. However, this embodiment requires an inductive circuit, which results in losses in power between the antenna and the induction coil. The antenna transmitter induces a current onto the inductive winding, and this induced current then travels up the wireline, where it can be detected by standard current flow detection equipment.

According to another aspect of the invention, methods of operation of a data sonde according to the first aspect are provided.

In a further aspect of the invention there is provided a system and method for communicating between a data sonde and a remote apparatus physically connected by a power supply. In the method, the antenna of a data sonde is selectively energised, the selective energisation representing a signal to be transmitted to the remote receiving apparatus, and the signal is then decoded at the remote apparatus by monitoring the power consumption of the data sonde. In an embodiment, the selective energisation represents a DC modulation in the base band power consumption of the antenna of the data sonde. In an embodiment the selective energisation represents encoded data representing parameters measured by the data sonde, or received by the data sonde from one or more other devices.

The system of an embodiment of this further aspect of the invention comprises circuitry to control the energisation of an antenna operably connected to the data sonde to impart a signal representing data to be transmitted to the remote receiving apparatus, and a detector at the remote apparatus to detect the data for output at the remote apparatus from the signal from the data sonde. In an embodiment, the selective energisation represents a DC modulation in the base band power consumption of the antenna of the data sonde. In an embodiment the selective energisation represents encoded data representing parameters measured by the data sonde, or received by the data sonde from one or more other devices.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Specific embodiments of the invention will now be described, purely by way of example, with reference to the accompanying drawings, in which.

DETAILED DESCRIPTION OF SPECIFIC EMBODIMENTS

Figure 1:
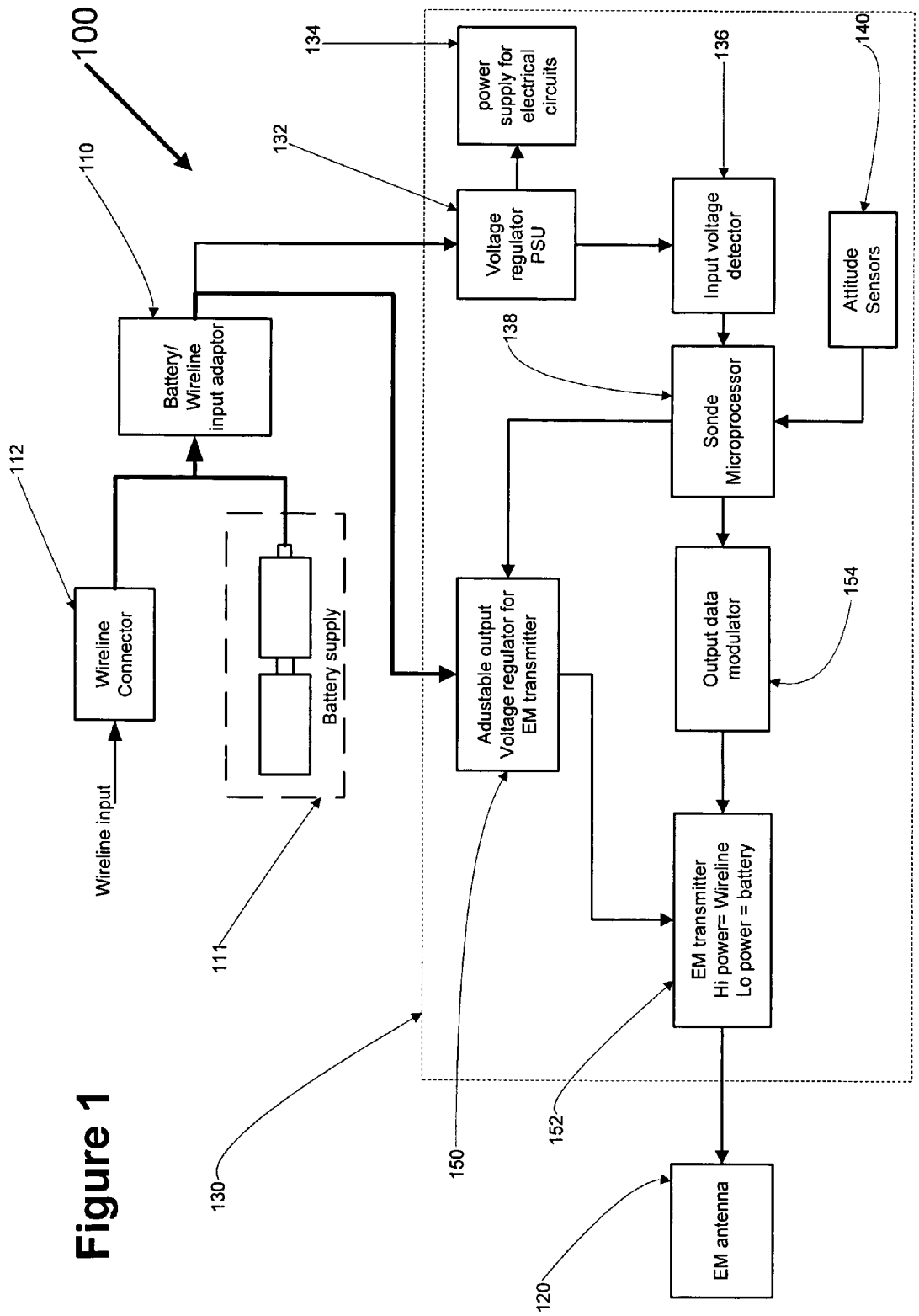
FIG. 1 shows a data sonde according to a first embodiment of the invention.

FIG. 1 shows a data sonde 100 according to a first embodiment. The data sonde 100 comprises a power supply receiving unit 110, which receives either a wireline 120 from a surface control unit, or one or more batteries 125 for alternative power of the data sonde 100 when a wireline 111 is not connected to it through the power supply receiving unit 110.

An antenna 120 is also provided, which is connected to the power supply receiving unit 110, and which emits an electromagnetic signal. Control circuitry 130 is also provided, which controls the emission of the antenna 120.

The power supply receiving unit 110 comprises a female recess, into which can be placed either one or more batteries 111, or a male connector 112 from a wireline, depending upon whether the sonde 100 is to be battery powered or wireline powered. The antenna 120 is controlled by the control circuitry 130 and radiates an electromagnetic field for use in determining the location of the sonde 100, which can be detected by a surface locator.

The control circuitry 130 receives power from the power supply receiving unit 110. The control circuitry 130 comprises a power section and a control section. The control section comprises a voltage regulator 132, which receives power supply from the power supply receiving unit 110 and supplies it to other electrical circuits 134 of the sonde 100, and to an input voltage detector 136. The voltage detector 136 detects whether the sonde 100 is receiving battery power or wireline power, wireline power having a higher voltage, and inputs data representing this information into a microprocessor 138. The microprocessor 138 also receives other data from various sensors within or connected to the sonde 100 from sensors 140. The sensors 140 may be housed within the sonde 100, or may be external thereto.

Within the power section of the control circuitry 130, an adjustable output voltage regulator 150 is provided, which powers an EM transmitter circuit 152. The EM transmitter 152 is a constant current transmitter. The power drawn by the transmitter 152 is therefore proportional to the voltage supplied to it. The microprocessor 138 controls the adjustable output voltage regulator 150 on the basis of the voltage detected by the voltage detector 136. The adjustable output voltage regulator 150 receives the power supply from the power supply receiving unit 110 and regulates the power output to the EM transmitter 152.

The microprocessor 138 also produces an encoded output at a relatively low data rate of approximately 37.5 Hz. The encoded output is input into an output data modulator 154. The output data modulator 154 controls the energising of the EM transmitter 152. The EM transmitter 152, when energised, generates a high frequency AC signal. The transmitter 152 draws a constant current and voltage when turned on and minimal current and voltage when turned off. Therefore, the transmitter 152 acts as an AC isolator between the antenna 120 and the power supply receiving unit 110. Therefore, when operating under battery power, the AC frequencies do not travel back to the power supply receiving unit.

The EM transmitter 152 output is the output of the control circuitry 130, and this transmitter 152 output energises the antenna 120 causing it to emit radiation at the same high frequency generated by the transmitter 152. This high frequency oscillation can be detected by a locator on the surface. In addition to the AC signal generated by the transmitter 152, which is emitted by the antenna 120, the output data modulator 154 controls the energisation of the transmitter 152. The output data modulator 154 is effectively a switch turning the transmitter 152, and therefore antenna 120, on and off.

Figure 2:
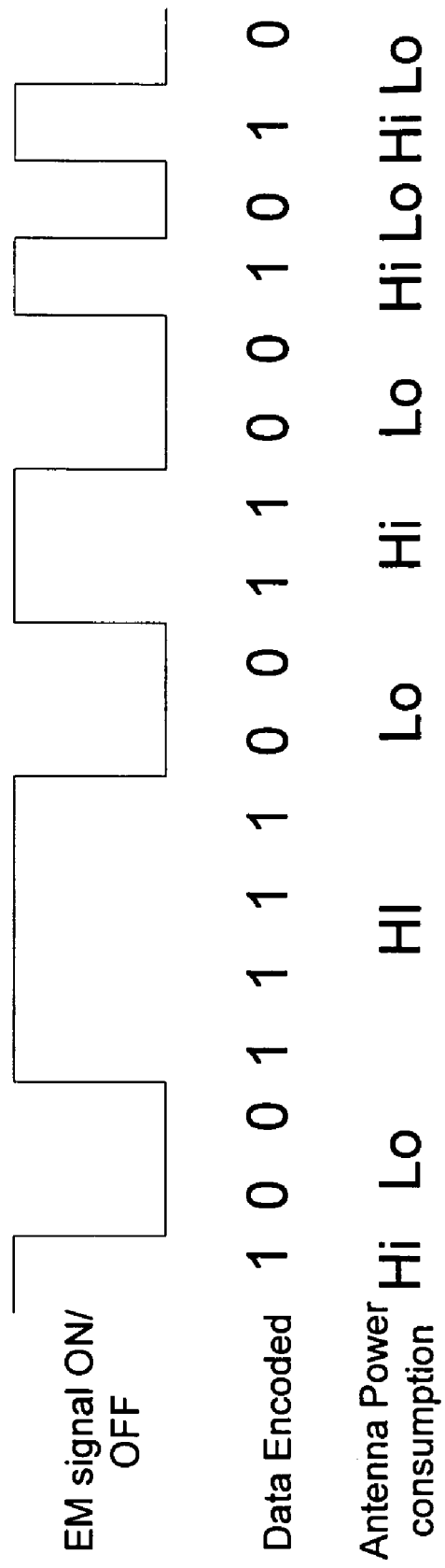
FIG. 2 shows exemplary power consumption by the data sonde of the first embodiment of the invention, the surface control unit detected power provision.

As shown in FIG. 2, the effect of the output data modulator 154 is to create a DC signal on the AC antenna emission. This signal is a binary signal. The antenna 120 is turned on and off in an encoded manner. The effect of the output data modulator 154 control of the transmitter 152 is two-fold. Firstly, the AC emissions from the antenna 120 are binary modulated. Secondly, the power supply drawn by the antenna 120, which makes up the majority of the power drawn by the sonde 100, is modulated in correspondence with the on-off modulation of the antenna 120.

This binary signal can be detected. When the sonde 100 is operating in battery mode, the binary signal can be detected by circuitry in the locator detecting the on-off modulation of the emitted signal, and then decoding the modulation. In wireline mode, the power drawn by the antenna 120 can be monitored and the on-off binary signal detected and decoded similarly. This detection of the modulation is simplified by the fact that the antenna 120 power makes up the majority of the power consumption of the sonde 100.

This mode of operation is therefore suitable for both wireline and battery operation, with no change in circuitry or operation required. Such a sonde can therefore be either battery or wireline powered, while having no requirement for separate operating modes and circuitry for each, thus saving space and allowing the sonde to be compact.

Figure 3:
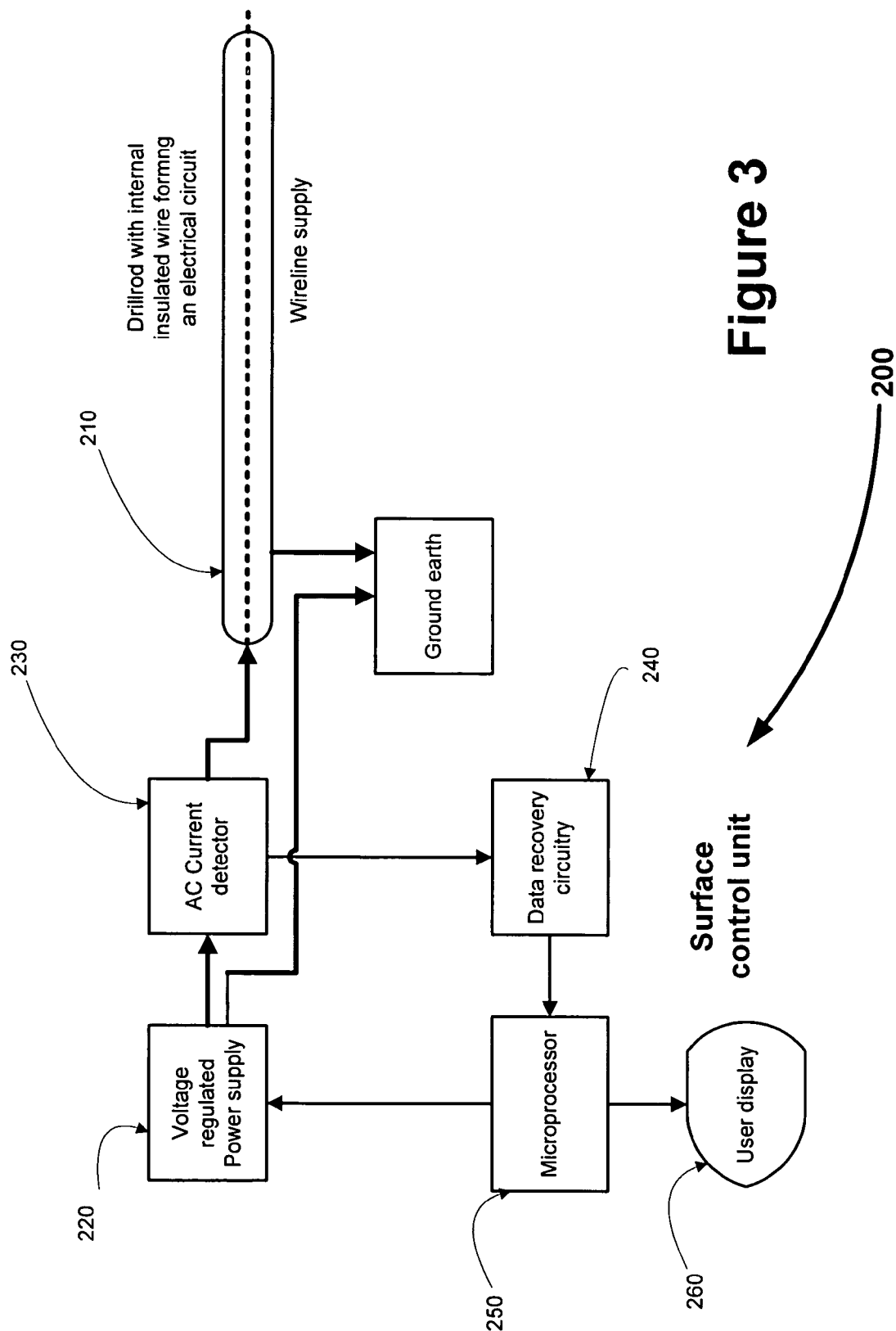
FIG. 3 shows a surface control unit for use with a data sonde according to the present invention.

FIG. 3 shows an apparatus for use in detecting the on-off modulation of the antenna when the sonde 100 of the first embodiment of the invention is operating in wireline mode. The wireline 210 itself comprises a drill rod with internal insulating wire, which forms an electrical circuit (the exterior of the drill rod providing a connection to earth). A voltage regulated power supply is generated in the power supply unit 220 and input into the wireline 210 via a current detector 230. The current detector 230 detects the current drawn from the sonde 100 along the wireline 210. The detected current drawn is fed to a data recovery circuit 240 and the decoded data is fed in a microprocessor 250, which outputs for display the results on a user display 260.

In this way the secondary data from the sonde can be communicated along the wireline 210 without a change in operation of the sonde 100 from when it is operating as a battery sonde.

Figure 4:
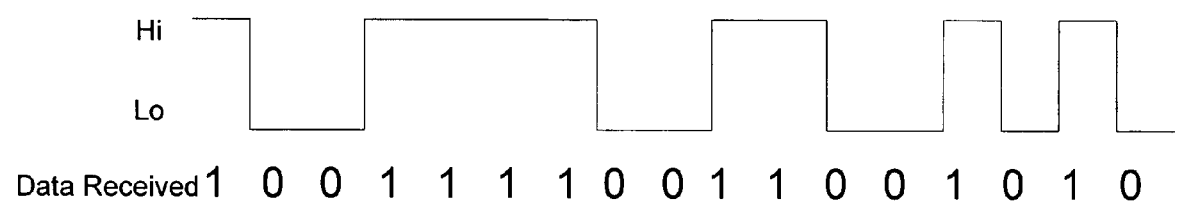
FIG. 4 shows an exemplary detected power consumption of the sonde of the first by the surface control unit.

FIG. 4 shows data received from the wireline by the surface unit. A binary 'one' is represented where high wireline current (indicating high current draw from the sonde) is detected, and a binary 'zero' is represented where low wireline current is detected.

Figure 5:
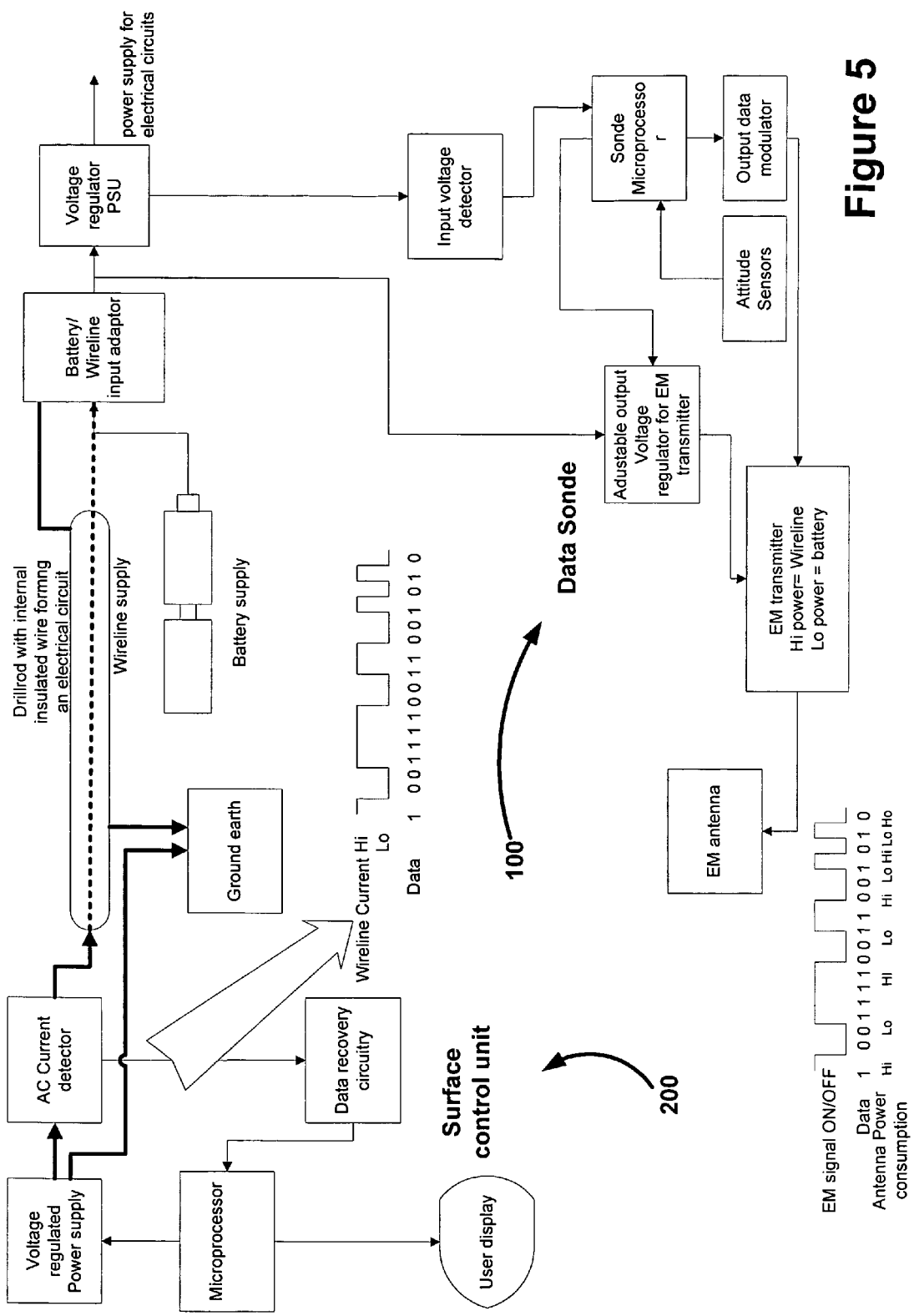
FIG. 5 shows a system comprising a surface control unit and sonde according to embodiments of the invention.

FIG. 5 shows a system comprising both a sonde and a surface control unit. The sonde and surface control unit correspond to those discussed above. The operation of the system is as described above in relation to the surface control unit and sonde, when in wireline operation.

Figure 6:
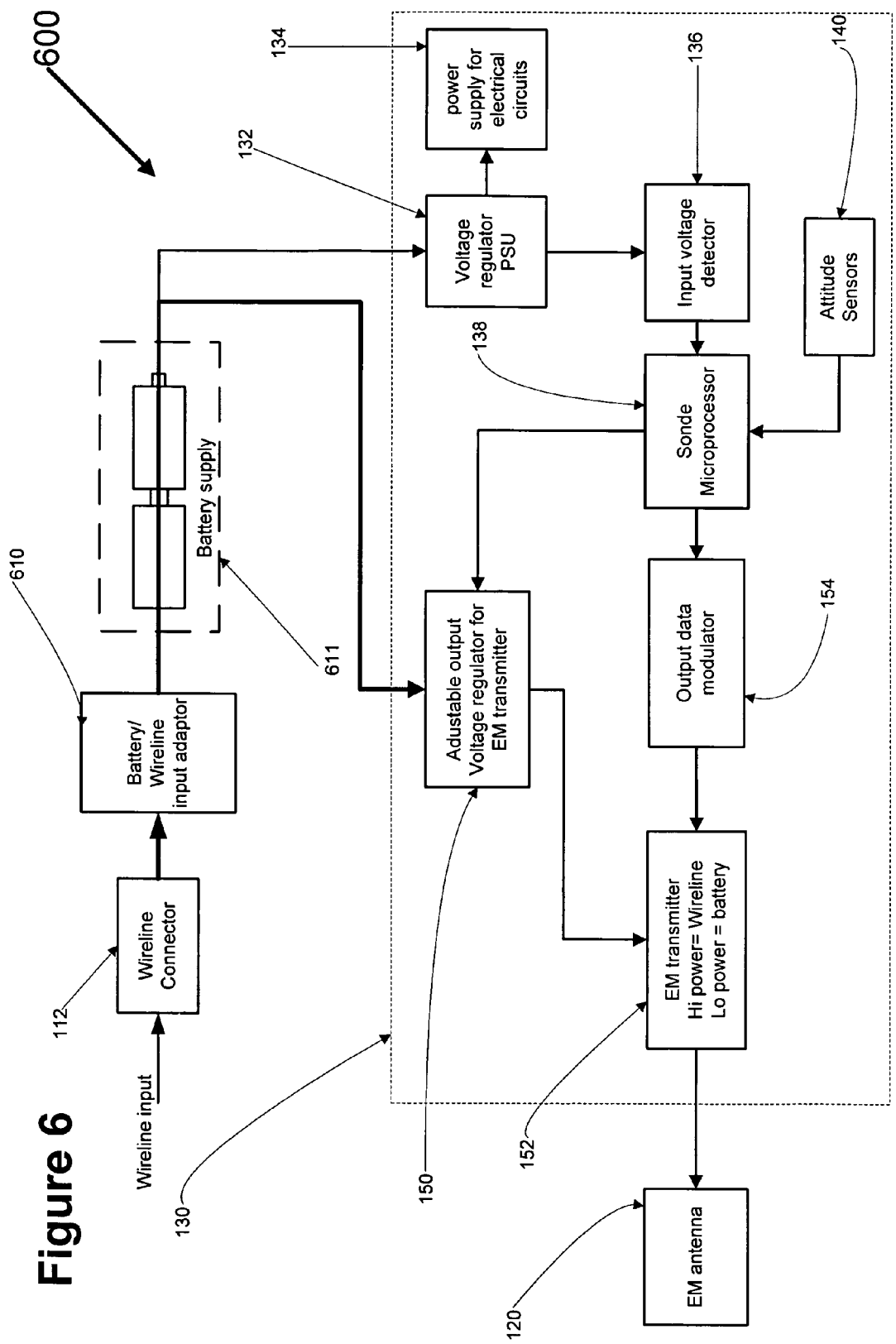
FIG. 6 shows a further embodiment showing an alternative sonde.

FIG. 6 shows a second embodiment, similar to the sonde of the first embodiment, where the batteries 611 are placed in series with the wireline connector 112 after the power supply receiving unit 610. The sonde 600 functions in the same way and is the same in other respects to the sonde 100 described above.

Figure 7:
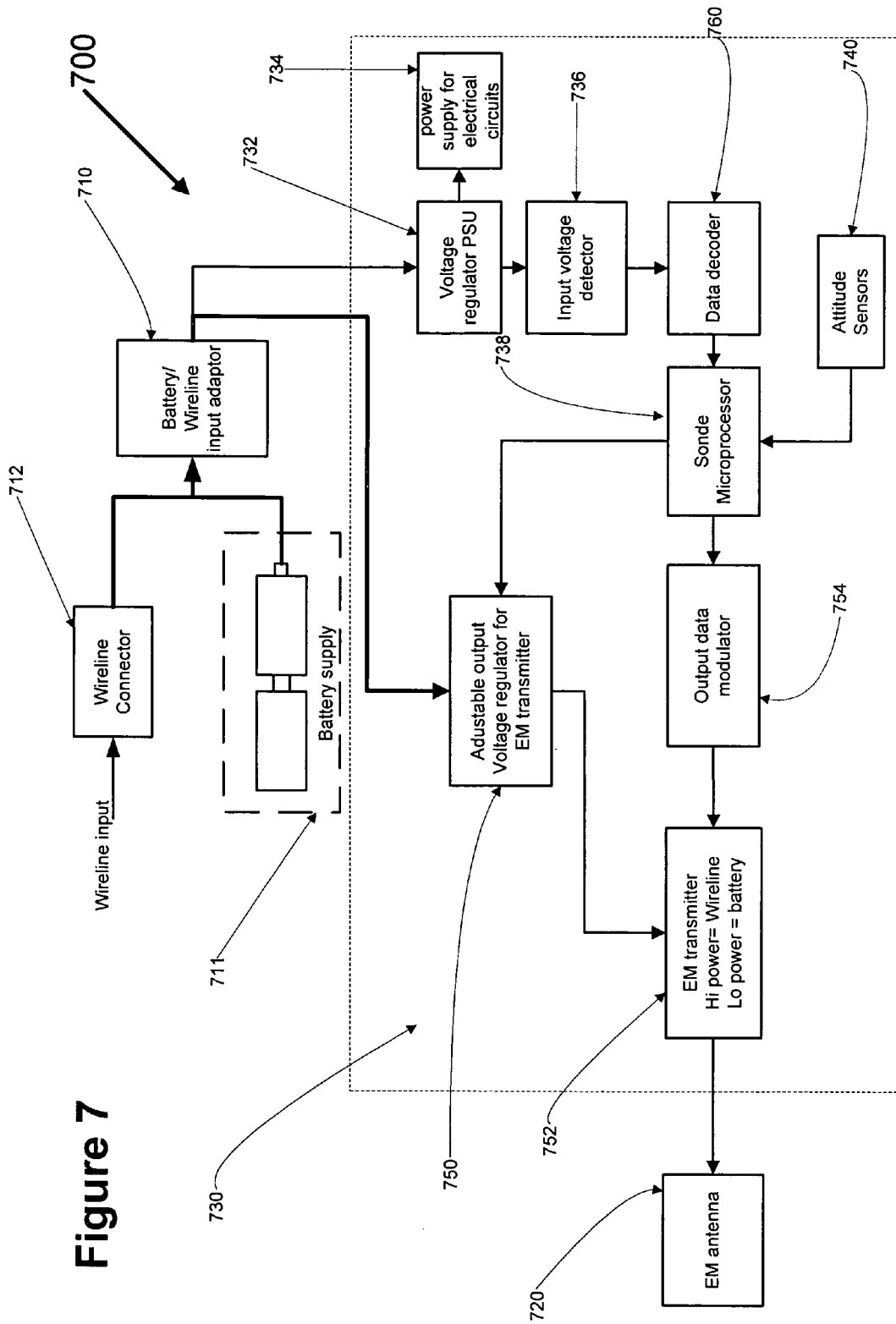
FIG. 7 shows a third embodiment showing a further alternative sonde.

Additionally, the voltage detector of the first and second embodiments can be adapted, as shown in a third embodiment in FIG. 7, to identify whether it is receiving normal wireline voltage, battery voltage, or a third voltage, which indicates that the wireline power supply is carrying a signal, which can be decoded. An additional data decoder 760, acting as receiving means, is provided between the input voltage detector 736 and the sonde microprocessor 738 to decode the signal from the surface control unit, which could be the surface control unit described with reference to FIG. 9 below. The data decoded by the data decoder 760 is fed into the sonde microprocessor 738. The data by be instructions to the sonde to alter operational characteristics, such as locate frequency or sensor signal conditioning functions etc.

The communication system may also be used to replace or upgrade software for the purposes of product maintenance or functional upgrade.

The sonde of the third embodiment may function either as a wireline or battery sonde, as in the first and second embodiments. Alternatively, the sonde may be a dedicated wireline sonde, in which case parts 710 and 711 are simply omitted from the sonde and the wireline input can be fed directly into the sonde circuitry.

Figure 8:
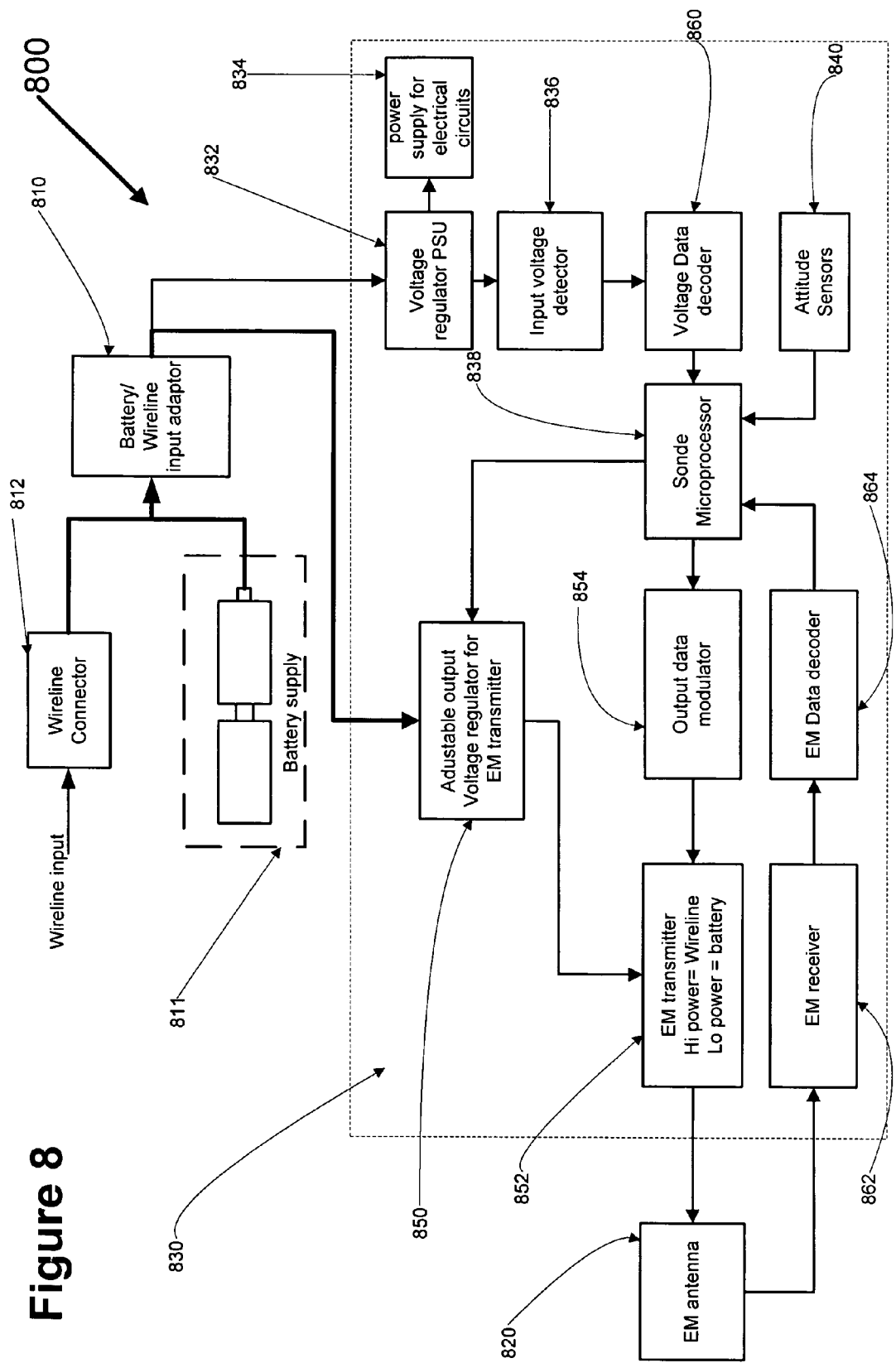
FIG. 8 shows a fourth embodiment, relating to the invention.

FIG. 8 shows a sonde according to a fourth embodiment. The sonde according to the fourth embodiment is similar to that of the third embodiment. In addition to the operational units of the third embodiment, which have the same or equivalent functions and reference numbers have the initial number 7 replaced with an 8, an EM receiver 862 is provided. The EM receiver is connected to a data decoder 864. The data decoder 864 is connected to the sonde microprocessor 836.

Figure 9:
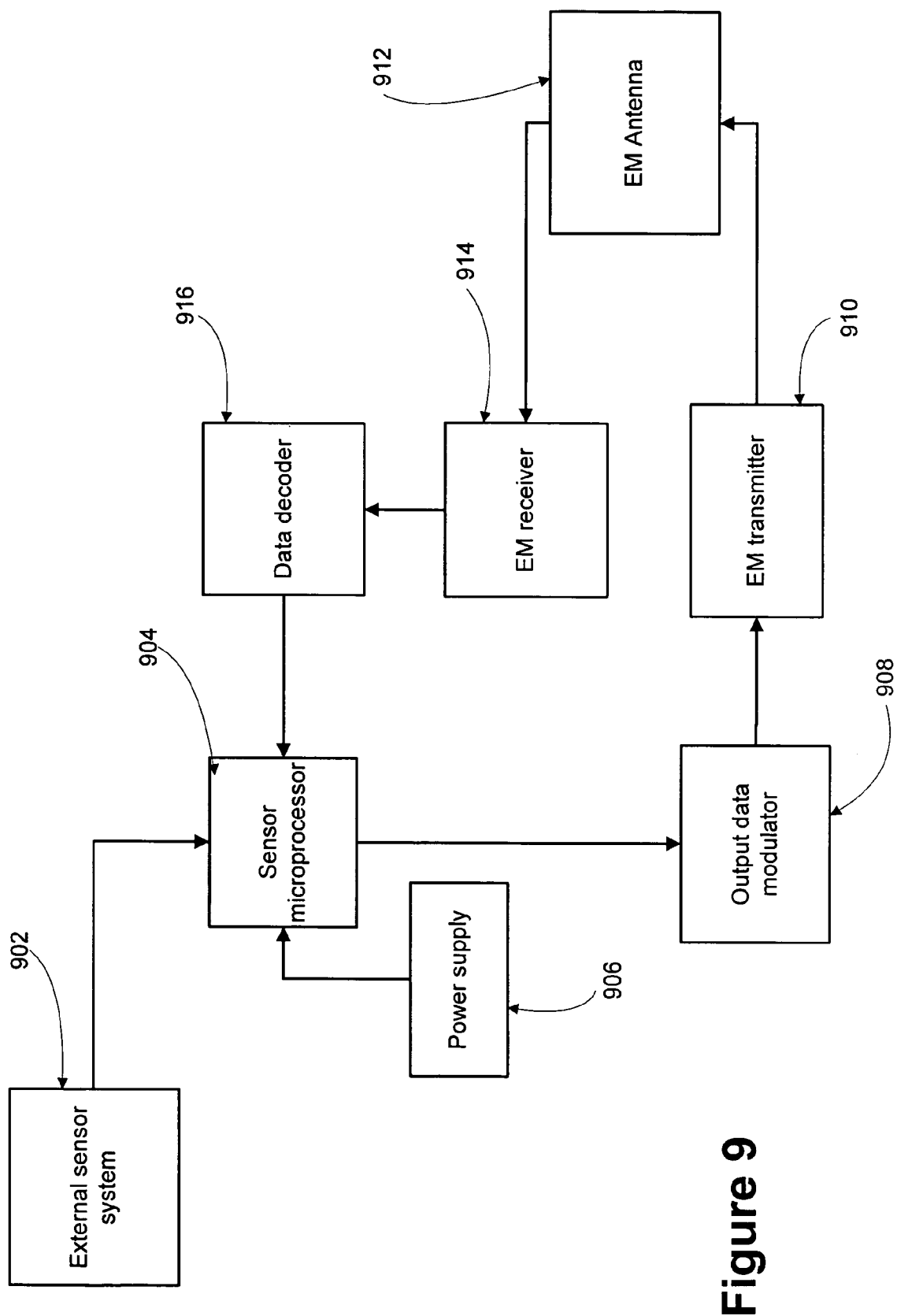
FIG. 9 shows an external sensor system for use with the sonde of the fourth embodiment.

The EM antenna 820, as well as transmitting at a low D.C. modulation rate as described above, also receives EM signals and converts them into an electrical signal, which is passed to the EM receiver 862. The EM receiver 862 then passes the received signal to the data decoder 864, which decodes the received signal, and the data decoder 864 passes the decoded data to the sonde microprocessor 836, which processes the information received. The information received may be from an external sensor system, as shown in FIG. 9, described below. The data received may relate to information sensed by the external sensor system. The sonde microprocessor 838 may use these external sensed information to modify its operation, or what, if anything is transmitted to the surface, which could be by the system described in relation to the first, second and third embodiments, or could transmit the data received from the EM antenna 820, or a processed version of it, through the EM emission modulation, to the surface.

The sonde 800 of the fourth embodiment may be a wireline/battery sonde as described above in relation to the first and second embodiments, or may be a dedicated wireline sonde, in which case parts 810 and 811 are omitted as may be done in the third embodiment. Alternatively, the sonde 800 may be a dedicated battery sonde, in which case parts 810 and 812 may be omitted.

FIG. 9 shows a suitable external sensor system 900 for use with a sonde according to the present invention. The sensor system 900 comprises one or more sensors 902, connected to a sensor microprocessor 904. The sensor microprocessor is connected to a power supply 906. A output data modulator 908 is connected to the sensor microprocessor 904, and an EM transmitter 910 is connected between the output data modulator 908 and an EM antenna 912.

The data detected by the sensor(s) 902 is input into the sensor microprocessor 904, which processes the data received. The sensor microprocessor 904 generates data to be output and provides it to the output data modulator 908, which controls the EM transmitter 910, which, in turn, drives the EM antenna 912 to output an EM signal.

Also connected to the EM antenna is a data decoder 916, via an EM receiver 914. The data decoder decodes data received by the EM antenna, and provides it to the sensor microprocessor 904. In this way, the sensor microprocessor 904 can control the output of the EM antenna 912 so that it is energised only when the sonde antenna 820 is not transmitting. In this way, swamping of the signal is avoided, and the sonde EM data decoder 864 will receive the signal output from the external sensor system 900. It is also possible for the sonde microprocessor 838 and sensor microprocessor 904 to have two way communication between them in this way.

Figure 10:
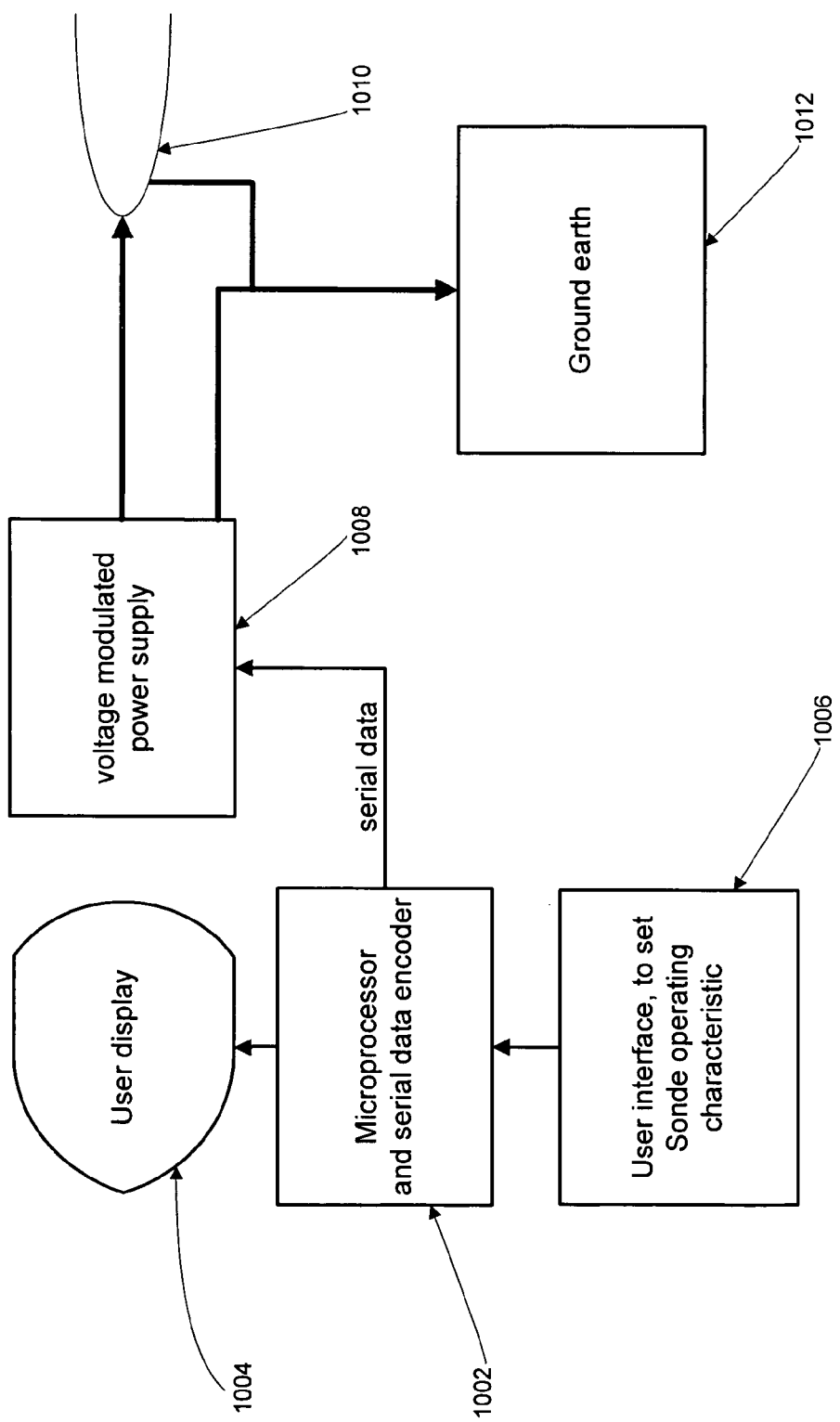
FIG. 10 shows a surface control unit for use with the sonde of the fourth embodiment.

FIG. 10 shows a surface control unit 1000 that could be used with the sonde of the fourth embodiment. The surface control unit comprises a microprocessor and serial data encoder 1002, connected to a user display 1004, a user interface 1006, and a voltage modulated power supply 1008.

The microprocessor 1002 receives parameters and instructions from the user interface 1006, which can be used to configure the sonde. The user display 1004 shows the current operation and other characterisics and data relating to the sonde, and, where the surface control unit 1000 is modified to include features of the surface control unit of the first embodiment, shows data received from the sonde along the wireline. The microprocessor 1002 controls the voltage modulated power supply 1008 to send data as voltage modulations along a wireline 1010, to the sonde, where the data is decoded as described above.

As described above, the voltage output from the surface control unit 1000 is modulated to send data to the sonde 800. The data is sent while the sonde 800 is not transmitting and is detected as described above. The sonde 800 may simply be programmed not to transmit for certain periods of time, in order to allow half-duplex communication from the surface control unit 1000 to the sonde 800. Alternatively, the sonde 800 may be communicating with the D.C. amplitude modulation, which can also be detected at the surface, making use of a surface control unit having decoding features as discussed above in relation to the first embodiment, which is altered to also include the data transmission features of the surface control unit of FIG. 10.

Figure 11A:
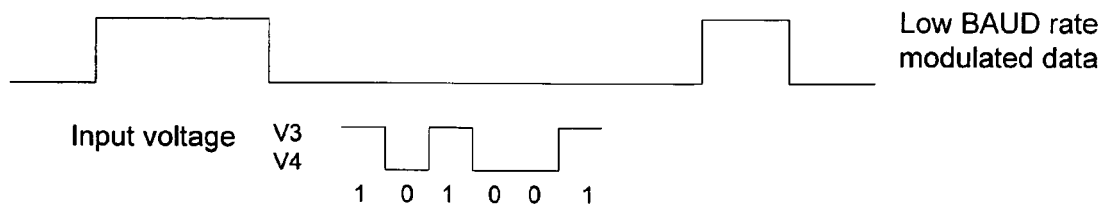
FIG. 11 shows an example of the interleaving of first and second data transmissions.
Figure 11B:
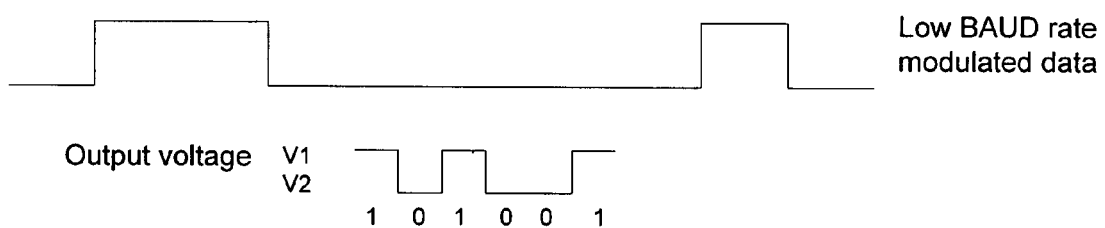
Figure 11C:
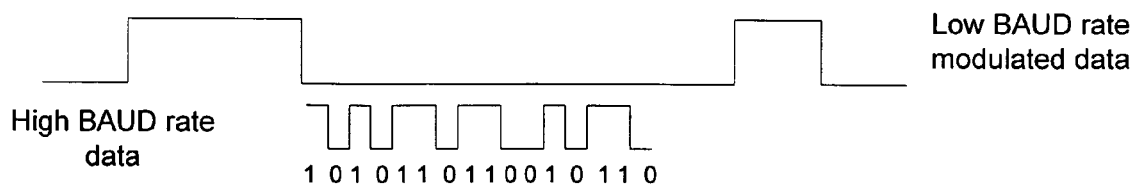

FIG. 11 shows exemplary communication between the sonde 800 and the surface control unit 1000, and the sonde 800 and the external sensor system 900. In FIG. 11*a*, the voltage output from the surface control unit 1000 is shown in relation to the D.C. binary modulated signal output from the sonde 700, 800, as described above. In FIG. 11*b*, the voltage detected by the input voltage detector 736, 836 is shown, again in relation to the D.C. binary modulated signal output from the sonde. FIG. 11*c* shows the interleaving of signals from the sonde 800 and from the external sensor system 900.

Where data from the sonde is 100% AM modulated onto the carrier frequency as a binary signal, a data bit 1 is transmitted as carrier ON and logic 0 as carrier OFF. The transmitted data bit rate is set to a conveniently low rate, typically 37.5 BAUD for the purposes of EM interference rejection by the surface located receiver circuits. In normal operation the transmitter will be OFF for integral multiples of the bit rate, this period is available for receiving data.

Because the receive data rate is set faster than the output transmitted data rate, the transmission and reception processes can be interleaved. In a typical embodiment transmit is set at 37.5 BAUD and receive 4800 BAUD. This ratio gives a maximum of 128 data bits can be received during each transmitted logic 0-bit period. It is desirable to provide a practical time interval after transmission stops for receive circuits to recover and become ready to detect the incoming data; accordingly a practical limit is typically 100 bits.

With synchronous communication processes between received and transmitted data the interleaving process described may be complicated to control. This process can be simplified by reducing the amount of data transmitted and increasing the number of times it is transmitted. By this means the probability of successful communication can be increased at the expense of overall data rate.

Figure 12:
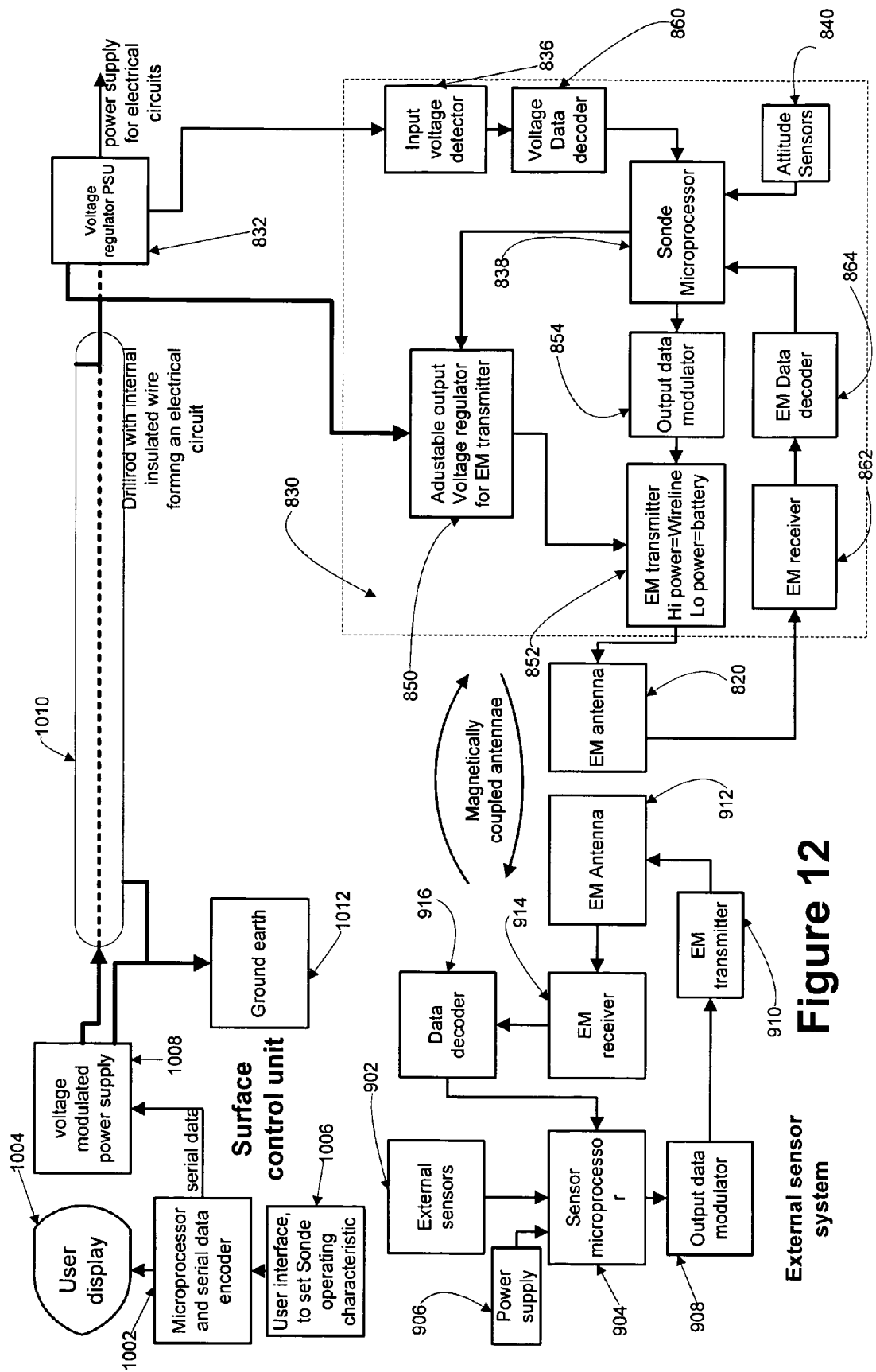
FIG. 12 shows a system employing the sonde of the fourth embodiment.

FIG. 12 shows a system for bi-directional communication according to the fourth embodiment of the invention. The system comprises a sonde 800, as described above, a surface control unit 1000, and an external sensor system 900. The external sensor system 900 and sonde 800, communicate via the magnetically coupled antennae 820, 912 as described above.

One or more features of the sonde of the fourth embodiment can be incorporated into the sonde of the first, second or third embodiments in order that the sonde of the fourth embodiment can operate in the same transmission manner as that of the first, second and third embodiments, as described above i.e. using the same emission system that works whether in wireline or battery operation. Additionally, one or more features of the surface control unit for use with the first embodiment may be incorporated into the surface control unit of the fourth embodiment, and vice versa.

Parts of the present invention can be implemented in hardware, software, firmware, and/or combinations thereof, including, without limitation, gate arrays, programmable arrays ("PGAs"), Field PGAs ("FPGAs"), application-specific integrated circuits ("ASICs"), processors, microprocessors, microcontrollers, and/or other embedded circuits, processes and/or digital signal processors, and discrete hardware logic. Parts of the present invention can be implemented with digital electronics, with analogue electronics and/or combinations of digital and analogue electronics.

Any discussion of the prior art throughout the specification is not an admission that such prior art is widely known or forms part of the common general knowledge in the field.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention is claimed:

1. A data sonde for use in horizontal directional drilling, the data sonde comprising:
   a power supply receiving unit adapted to receive either of at least one internal battery and an external power supply cable; and
   an antenna to emit radiation, wherein the antenna is arranged to receive operative power from the external power supply cable when external power is supplied to the power supply receiving unit through it, and from the internal battery if no external power supply is received at the power supply receiving unit.

2. A data sonde according to claim 1, further comprising control circuitry to control antenna emission.

3. A data sonde according to claim 2, wherein the control circuitry is adapted to control the sonde to emit a secondary signal, said signal comprising information from the sonde.

4. A data sonde according to claim 3, wherein the sonde is adapted to emit the secondary signal through the antenna.

5. A data sonde according to claim 3, wherein the control circuitry is adapted to selectively energise the antenna.

6. A data sonde according to claim 5, wherein the control circuitry is adapted to control the antenna to emit the secondary signal as a DC modulation.

7. A data sonde according to claim 5, wherein the sonde is adapted to output the secondary signal through the power supply receiving unit when an external power supply is connected through the power supply receiving unit.

8. A data sonde according to claim 7, wherein the secondary signal is transmitted through the power supply receiving unit in the form of the DC power, current or voltage drawn by the sonde.

9. A data sonde according to claim 8, wherein the secondary signal comprises data relating to one or more parameters chosen from the group comprising: pitch; azimuth angle; yaw; speed of drilling; battery consumption.

10. A data sonde according to claim 3, wherein the sonde is adapted to emit the secondary signal as a binary signal from the antenna, and also as a binary signal through the power supply receiving unit if an external power supply is received by the power supply receiving unit, by binary modulation of the emission of radiation signal from the antenna.

11. A data sonde according to claim 1, wherein the power supply receiving unit is adapted to alternatively receive an inductive winding to receive radiation emitted by the antenna and output the received signal through the power supply receiving unit.

12. A data sonde for use in horizontal directional drilling, the data sonde comprising:
    power supply receiving means for receiving a power supply from either of at least one internal battery and an external power supply cable; and
    emitting means for emitting radiation, and receiving operative power from an external power supply when one is connected to the receiving means, and from a battery if no external power supply is connected to the receiving means.

13. A data sonde according to claim 12, further comprising control means for controlling antenna emission.

14. A data sonde according to claim 12, wherein the emitting means is also for emitting a secondary signal comprising information from the sonde.

15. A data sonde according to claim 14, wherein the sonde comprises secondary signal emitting means for emitting the secondary signal through the antenna.

16. A data sonde according to claim 12, wherein the secondary signal emitting means is for selectively energising the emitting means.

17. A data sonde according to claim 15, wherein the secondary signal emitting means is for emitting the secondary signal as a DC modulation corresponding to the power supplied to the emitting means.

18. A data sonde according to claim 17, wherein the secondary signal emitting means is for outputting the secondary signal from the sonde through the power supply receiving means when the sonde receives an external power supply through the power supply receiving means.

19. A data sonde according to claim 18, wherein the secondary signal is transmitted through the power supply receiving means in the form of the DC power drawn by the sonde.

20. A data sonde according to claim 14, wherein the sonde is adapted to emit the secondary signal as a binary signal from the emitting means, and also as a binary signal through the power supply receiving means if an external power supply is received by the power supply receiving means, by binary modulation of the emission of radiation from the emitting means.

21. A method of transmitting data from a data sonde for use in horizontal directional drilling, the method comprising:
    receiving a power supply from one of: an internal battery within the data sonde; and an external power supply connected to the sonde;
    using the external power supply to power an antenna in the sonde if connected to the sonde, and using the internal battery within the data sonde to power an antenna in the sonde if no external power supply is connected to the sonde.

22. A method according to claim 21, further comprising passing the power supply from the external power supply through the battery, if an external power supply is connected to the sonde.

23. A method according to claim 21, wherein the data sonde also emits a secondary signal.

24. A method according to claim 23, wherein the sonde emits the secondary signal through the antenna.

25. A method according to claim 23, wherein the sonde outputs the secondary signal from the sonde through the power supplied to the sonde when the sonde receives an external power supply.

26. A method according to claim 23, wherein the sonde selectively energises the antenna with a switch.

27. A method according to claim 26, wherein the switch acts as an AC isolator between the antenna and the power supplied to the sonde.

28. A method according to claim 26, wherein the sonde emits the secondary signal as a DC modulation corresponding to the power supplied to the antenna.

29. A method according to claim 28, wherein the secondary signal comprises data relating to one or more parameters chosen from the group comprising: pitch; azimuth angle; yaw; speed of drilling; battery consumption.

30. A method according to claim 21, wherein the antenna receives operative power from an external power supply cable when one is connected to the sonde, and by a battery housed in the battery housing if no external power supply cable is connected to the sonde.

31. A method according to claim 23, wherein the sonde emits the secondary signal as a binary signal from the antenna, and also as a binary signal through the power supplied to the sonde if an external power supply is received by the sonde, by binary modulation of the emission of radiation from the antenna.

32. A method according to claim 21, wherein the battery housing alternatively receives an inductive winding receiving radiation emitted by the antenna and outputs the received signal through the power supplied to the sonde.

33. A method according to claim 21, further wherein effective impedance of a battery mounted in the battery housing is increased to reduce AC loss in the battery.

34. A method according to claim 21, wherein an antenna winding placed in the sonde emits a radiative signal and antenna circuitry drives the antenna winding, wherein the sonde further selectively bypasses the antenna winding when an external power supply is connected to the sonde.

35. A method of communicating between a data sonde and a remote apparatus physically connected to a power supply, the method comprising:
    selectively energising an antenna of the data sonde with an encoded DC modulation representing data to be transmitted to the remote receiving apparatus;
    decoding the data at the remote apparatus from the DC modulation in power consumption of the data sonde corresponding to the DC modulated energising of the data sonde antenna.

36. A system for communicating between a data sonde and a remote apparatus connected by cable power supply, the system comprising:
    circuitry to control the energisation of an antenna operably connected to the data sonde with an encoded DC modulation representing data to be transmitted to the remote receiving apparatus;
    a detector at the remote apparatus to detect the data for output at the remote apparatus from the DC modulation in base band power consumption of the data sonde corresponding to the DC modulated energising of the data sonde antenna.

37. A system for communicating between a data sonde and a remote apparatus connected by a cable power supply, the system comprising:
    antenna control means for selectively energising an antenna of the data sonde with an encoded DC modulation representing data to be transmitted to the remote receiving apparatus;
    detecting means for detecting the data for output at the remote apparatus from the DC modulation in base band power consumption of the data sonde corresponding to the DC modulated energising of the data sonde antenna.

* * * * *